United States Patent [19]

Thayer, Jr.

[11] Patent Number: 4,896,175
[45] Date of Patent: Jan. 23, 1990

[54] PHOTOGRAPHY BOOTH AND METHOD

[76] Inventor: Donald O. Thayer, Jr., 153 Lincoln St., Garden City, N.Y. 11530

[21] Appl. No.: 253,652

[22] Filed: Oct. 5, 1988

Related U.S. Application Data

[63] Continuation-in-part of Ser. No. 932,365, Nov. 19, 1986, Pat. No. 4,804,983.

[51] Int. Cl.$^4$ .................. G03B 1/12; G03B 29/00
[52] U.S. Cl. .................. 354/76; 354/173.1; 354/209; 354/290; 358/224
[58] Field of Search .................. 354/75, 76, 219, 224, 354/225, 290, 209, 173.1, 212; 358/213.13, 224, 909

[56] References Cited

U.S. PATENT DOCUMENTS

| | | | |
|---|---|---|---|
| 1,794,142 | 2/1931 | Boston | 354/290 |
| 1,795,051 | 3/1931 | Simjian | 354/290 |
| 1,830,770 | 11/1931 | Simjian | 354/290 |
| 3,114,002 | 3/1963 | Siepmann et al. | 354/254 |
| 3,546,378 | 5/1970 | Karikawa | 354/75 X |
| 3,812,506 | 5/1974 | Kiebanow | 354/80 |
| 3,883,883 | 5/1975 | Sano et al. | 354/75 |
| 3,913,116 | 10/1975 | Kastner et al. | 354/223 |
| 3,921,189 | 11/1975 | Gallistel | 354/220 |
| 4,131,354 | 12/1978 | Hagiwara | 354/224 |
| 4,297,724 | 10/1981 | Masuda | 358/93 |
| 4,303,322 | 12/1981 | Someya | 354/319 |
| 4,560,261 | 12/1985 | Ueda | 354/121 |
| 4,676,624 | 6/1987 | Kiuchi et al. | 354/209 X |
| 4,693,579 | 9/1987 | Alfredsson et al. | 354/173.1 |
| 4,705,374 | 11/1987 | Robings | 354/225 |
| 4,769,699 | 9/1988 | Gebauer et al. | 354/75 |

*Primary Examiner*—A. A. Mathews
*Attorney, Agent, or Firm*—Shlesinger & Myers

[57] ABSTRACT

A self-photography booth comprises a booth having a first end portion for a person to be photographed and a spaced and aligned opposite second end portion. A camera is operably associated with the second end portion and includes a selectively operable film advance system for advancing a length of film having a plurality of frames through the camera in a sequential manner and a shutter button for selectively exposing a frame of the film with an image of the person. A video camera is operatively associated with the second end portion and with the camera for receiving the image of the person perceived by the camera. A video display is operably associated with the video camera and with the second end portion for displaying the perceived image. A push button selector assembly is operably associated with the camera for selectively causing or preventing operation of the film advance system after operation of the shutter assembly so that prevention of operation of the film advance system prevents the film from advancing to the next frame so that the exposed frame may be receive multiple exposures and operation of the film advance system causes the film to advance to the next frame.

20 Claims, 6 Drawing Sheets

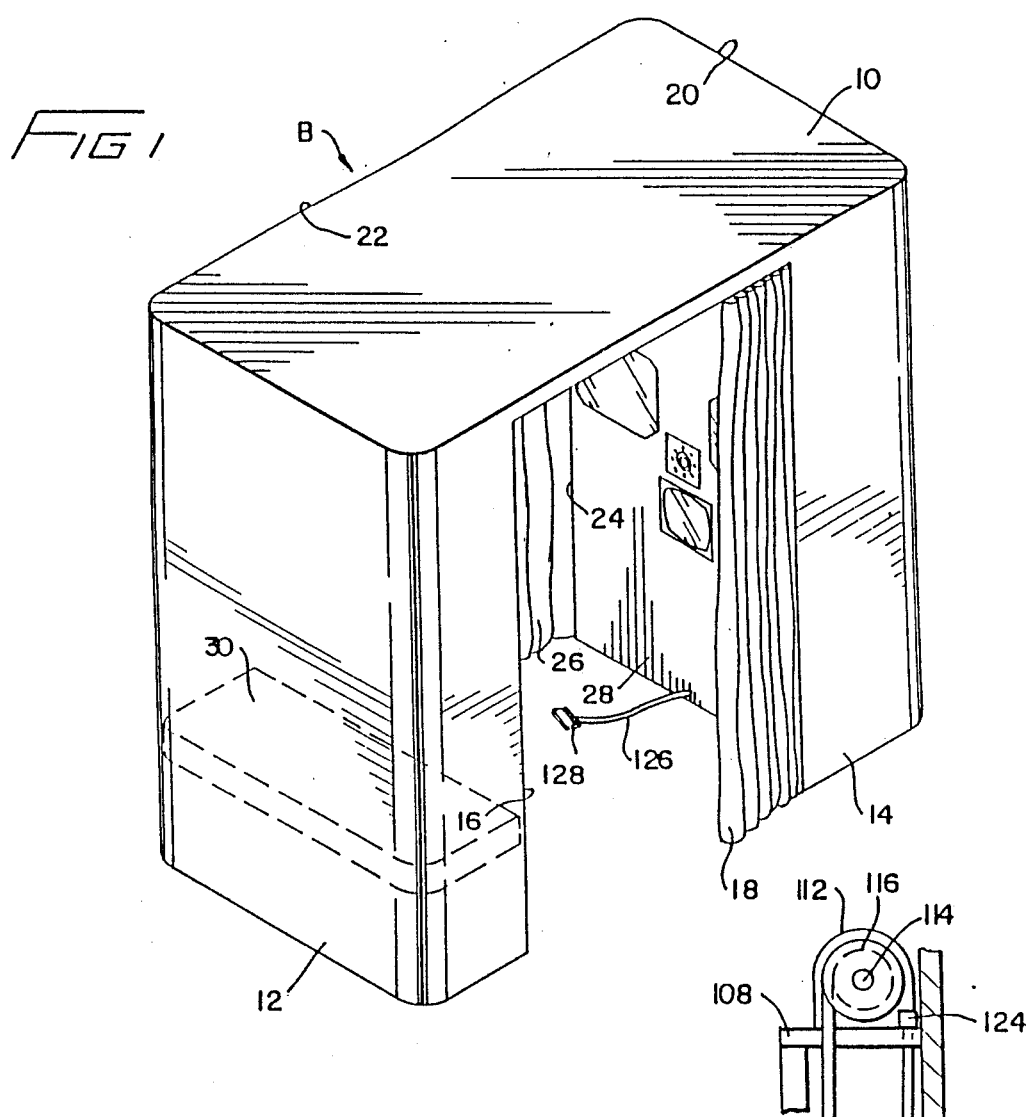
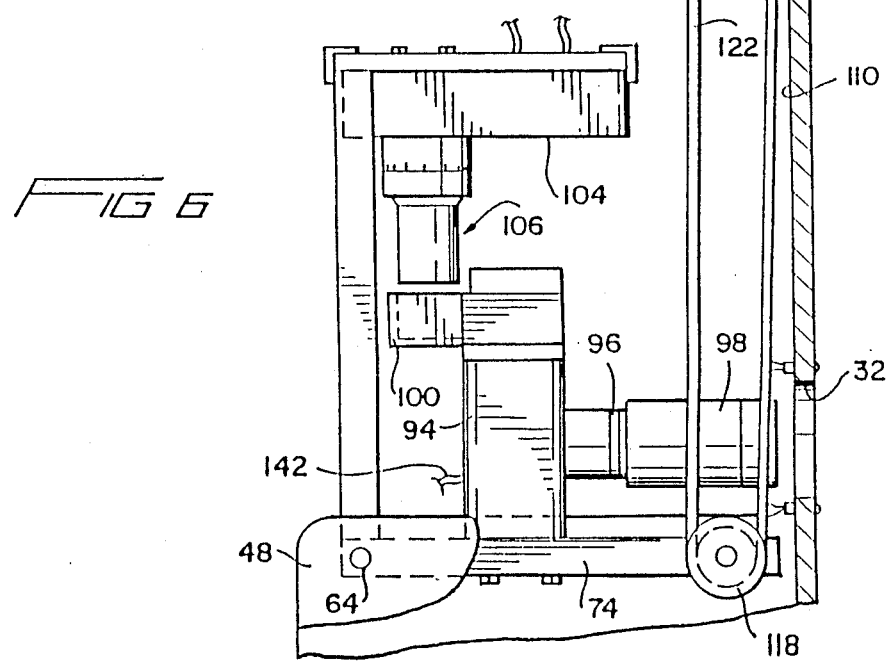

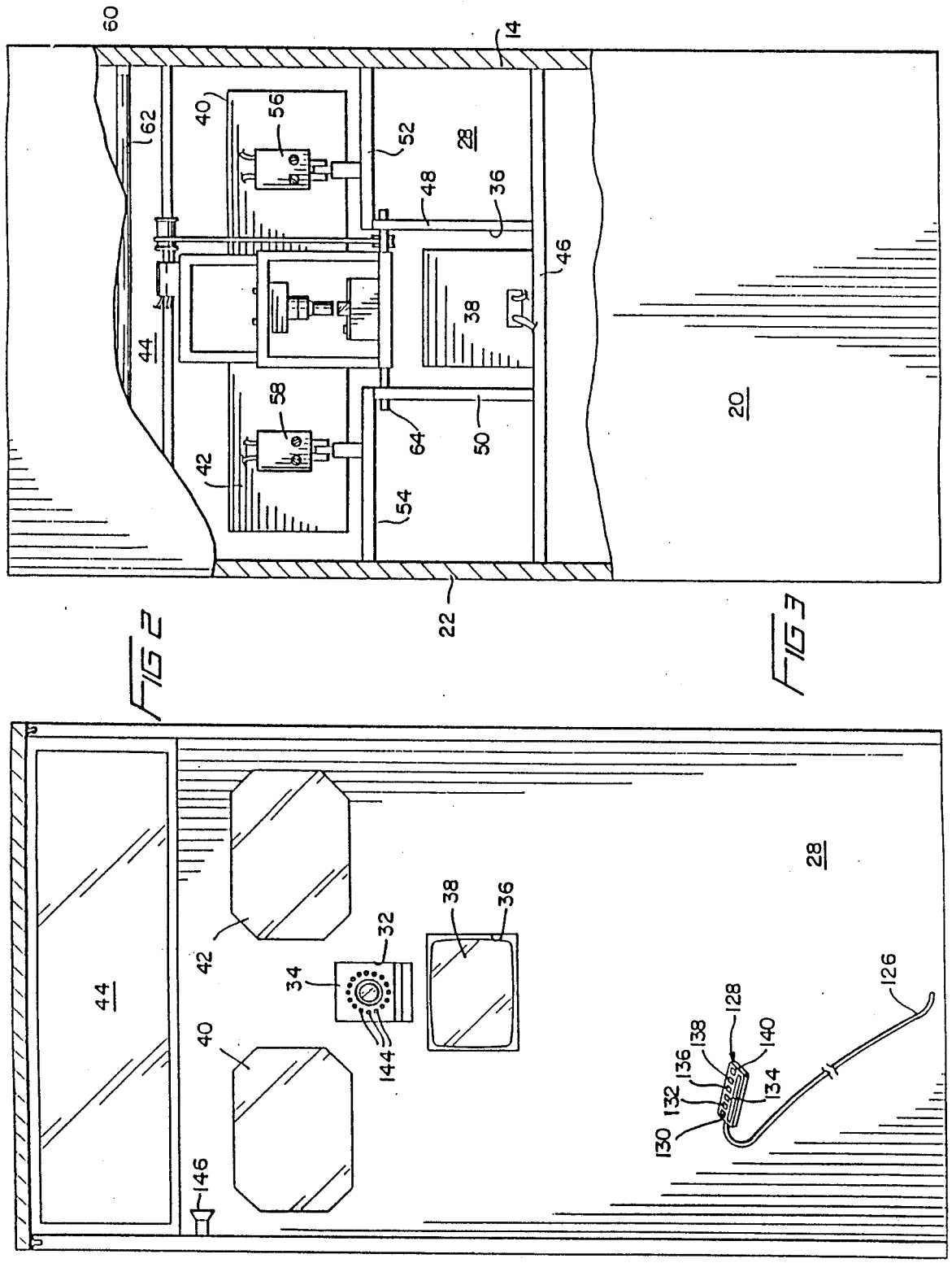

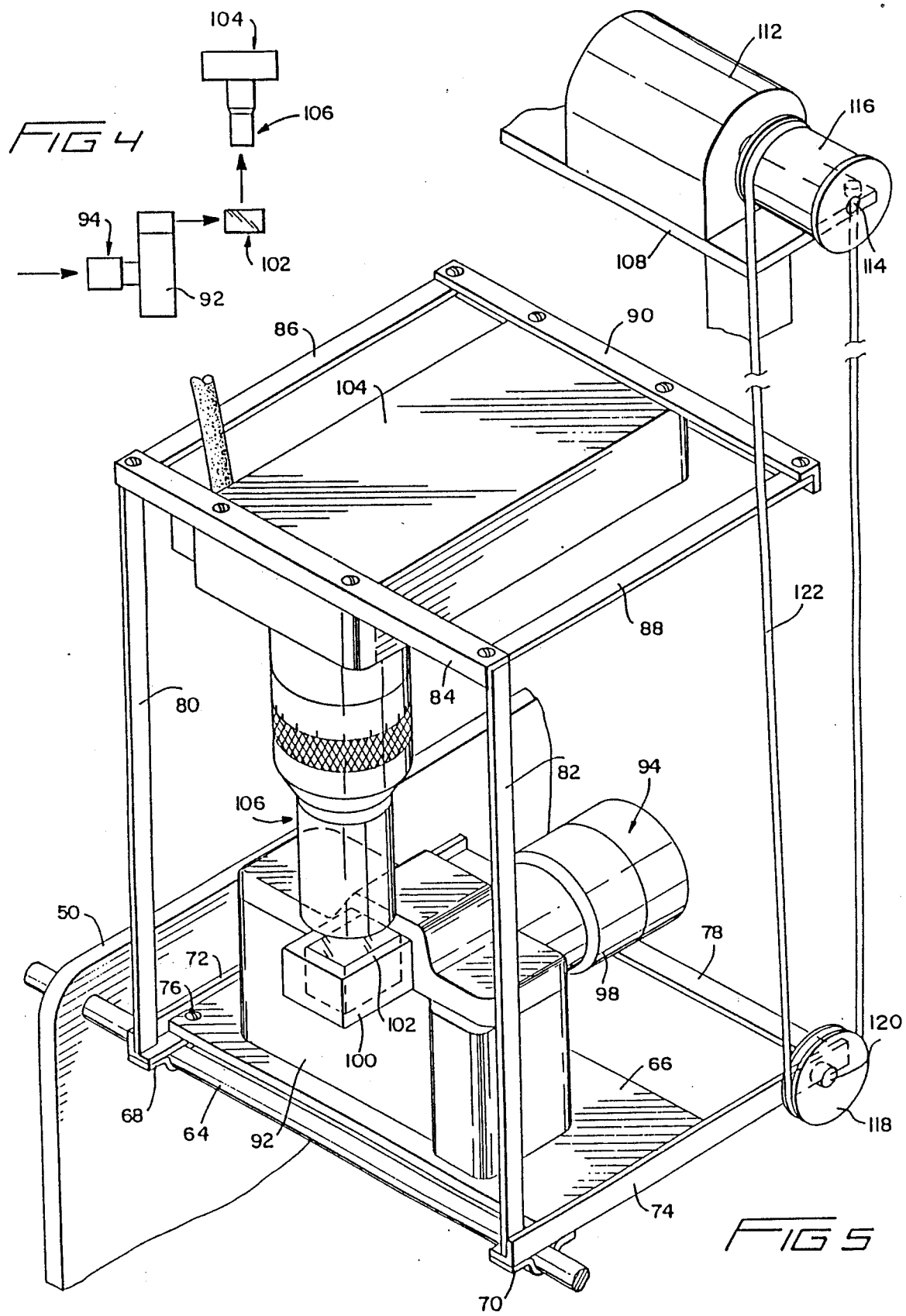

PHOTOGRAPHY BOOTH AND METHOD

This is a continuation-in-part of my copending application Ser. No. 932,365, filed Nov. 19, 1986, now U.S. Pat. No. 4,804,983, for Photography Booth and Method.

BACKGROUND OF THE INVENTION

Individuals frequently wish to have a photograph taken of themselves which they have posed. In the past, an individual was forced to resort to a camera having a time delayed shutter or a booth equipped with a camera and a mirror. In both instances, however, the individual could not completely perceive the image prior to the film being exposed.

The prior art discloses a number of photography booths and the like having various systems to permit the user to somewhat observe an image to be photographed. Many such booths utilize a system of mirrors. The mirrors may be vertically adjustable to accommodate persons of varying height. These mirror systems do not generally result in acceptable photograph quality because the user cannot be sure that the image perceived is the image to which the film is exposed.

In view of the above, it can be seen that there is a need for an improved self-photography device. Such a device should permit the user to be assured of the image to which the film is exposed. Such a device should permit the user to be assured that the image is centered, is the image which is desired and is of the desired pose.

The disclosed invention is a novel apparatus and method permitting self-photography. The invention utilizes a conventional single lens reflex film camera which has an externally mounted right angle prism directing the viewed or perceived image to a video camera. The video camera is connected to a monitor positioned closely proximate the lens of the film camera so that the user can observe the actual image which the film camera lens is receiving.

OBJECTS AND SUMMARY OF THE INVENTION

The primary object of the disclosed invention is a self-photography method and apparatus permitting the user to observe the actual image which is being received by the lens of the film camera and to which the film is exposed when the shutter is operated.

An additional object is to provide a self-photography booth which has the capability for multiple exposures for each frame of film.

A self-photography booth comprises a booth having a first end portion for a person to be photographed and a spaced and aligned opposite second end portion. Camera means are operably associated with the second end portion and include a selectively operable film advance system for advancing a length of film having a plurality of frames through the camera means in a sequential manner, and means for selectively exposing a frame of the film with an image of the person. A video camera means is operably associated with the second end portion and with the camera means for receiving the image of the person perceived by the camera means. A video display means is operably associated with the video camera means and with the second end portion for displaying the perceived image. Means are operably associated with the camera means for causing exposure of a frame of the film with the perceived image. Means are operably associated with the camera means for selectively causing or preventing operation of the film advance system after operation of the exposure means so that prevention of operation of the film advance system prevents the film from advancing to the next frame so that the exposed frame may receive multiple exposures, and operation of the film advance system causes the film to advance to the next frame.

A self-photography booth comprises a booth having a first end portion for posing of a person to be photographed and an opposite second end portion for positioning a camera system. The camera system comprises a single lens reflex camera having a motorized film advance system and remotely operable means for causing selective exposure of the film. A video camera means is coupled with the camera for receiving the image of the person perceived by the camera and a video display means is operably associated with the video camera means for displaying the received perceived image so that the person to be photographed may view the image being perceived by the camera. Means are operably associated with the camera system for permitting or preventing operation of the film advance system after the remotely operable means has caused exposure of the film so that prevention of operation of the film advance system prevents the film from advancing to the next frame and thereby permits multiple exposures to be made, and permitting operation of the film advance system causes the film to advance to the next frame. Display means are operable associated with the camera system for indicating to the person to be photographed the frame number of the frame to be exposed, and the number of exposures made to the frame now available for exposure.

A method of taking self portraits comprises the steps of providing a photography booth comprising a first end portion for a person to be photographed and a spaced and aligned opposite second end portion for positioning a camera system. The camera system comprises a camera having a motorized film advance system and remotely operable means for causing selective exposure of the film, a video camera is coupled with the camera for receiving the image of the person perceived by the camera and a video display means is operably associated with the video camera for displaying to the person the image being perceived by the camera, means are operably associated with the camera system for permitting or preventing operation of the film advance system so that after operation of the remotely operable means the film advances to the next frame when the permitting or preventing means are set to permit advancement and the film is prevented from advancing so that multiple exposures may be taken when the permitting or preventing means are set to prevent advancement, and display means are operably associated with the camera system for indicating to the person to be photographed the number of the frame to be exposed and the number of exposures already made to the frame to be exposed. A person to be photographed is posed in the booth, and the permitting or preventing means is set in order to cause the film to advance or to be prevented from advancing after the film has been exposed. The remotely operable means are operated and thereby the film is caused to be exposed.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a perspective view illustrating the booth of the invention;

FIG. 2 is an elevational view of an interior end wall of the booth of FIG. 1;

FIG. 3 is an elevational view with portions broken away of the exterior of the endwall of FIG. 1;

FIGURE 4 is a schematic view illustrating the principle of the invention;

FIG. 5 is a fragmentary perspective view illustrating the platform and pivoting assembly of the invention;

FIG. 6 is a fragmentary side elevational view with portions broken away and partially in section further illustrating the pivoting mechanism of the invention;

DESCRIPTION OF THE INVENTION

Figure 7:
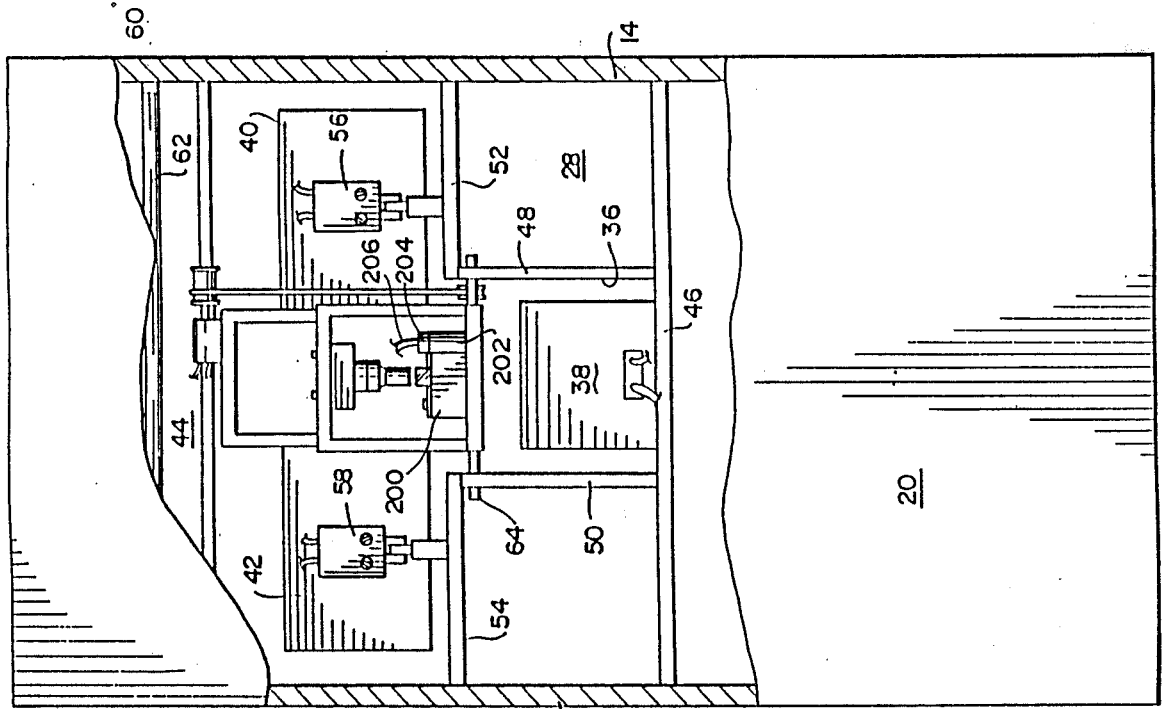
FIG. 7 is an elevational view of an interior end wall of a second embodiment of the booth of the invention.

Booth B, as best shown in FIG. 1, includes a top 10, rear end wall 12 and first side wall 14. It can be noted in FIG. 1 that side wall 14 has an opening 16 therein which may be selectively blocked by movable curtain 18. Preferably, the curtain 18 is of a heavy weight material which is substantially opaque to light to prevent entrance thereof into the booth B, as will be further explained. Booth B furthermore includes a front end wall 20 and a second side wall 22, which has an opening 24 therein which is also selectively blocked by movable curtain 26.

FIG. 1 furthermore discloses front wall 28 disposed forwardly of front end wall 20 within the interior of booth B. Cushion 30 is illustrated in phantom in FIG. 1 and is spaced from but in alignment with front wall 28.

FIG. 2 illustrates front wall 28. Front wall 28 has a first opening 32 therein to which cover plate 34 is affixed. Second opening 36 is disposed below opening 32 and video monitor 38, which is substantially the same as a conventional television set, is positioned in opening 36. It can be noted in FIG. 2 that the openings 32 and 36 are closely disposed relative to each other, for reasons to be explained.

Panes 40 and 42 are mounted to front wall 28 adjacent each other and slightly above opening 32. The panes 40 and 42 are, preferably, manufactured of glass or suitable material which is substantially transparent to light. Likewise, cover pane 44 is also mounted to front wall 28 above panes 40 and 42 and substantially spans the distance between side walls 14 and 22. As with panes 40 and 42, cover pane 44 is manufactured from glass or other similar optically transparent material.

Horizontal support 46 extends between the side walls 14 and 22 and end wall 20 and front wall 28, as best shown in FIG. 3. Spaced parallel vertical supports 48 and 50 extend from horizontal support 46 on either side of opening 36 and terminate short of opening 32. Horizontal support 52 extends from vertical support 48 to side wall 14 and support 54 extends from vertical support 50 to side wall 22.

Strobes 56 and 58 are mounted to the supports 52 and 54, respectively, and are aligned with the panes 40 and 42, respectively. The strobes 56 and 58 are of a type conventionally used by photographers and provide a sudden intense burst of illumination. The strobes 56 and 58 are sized and selected to provide sufficient illumination for a user of the booth B, when seated on the seat 30, to have a properly illuminated photograph taken thereof.

Fixture 60 is secured to side wall 14 and a corresponding fixture 60 is secured to side wall 22. A color balanced bulb 62 extends between the aligned fixtures 60 and provides illumination corresponding substantially to daylight. The light of the bulb 62 shines through the cover pane 44, preferably at all times. Those skilled in the art will appreciate that more than one bulb 62 is normally used, there being a sufficient number of bulbs to provide adequate illumination for the interior of the booth B.

Rod 64 extends between the vertical supports 48 and 50 and defines a pivot axis for platform 66 which is disposed rearwardly of the front wall 28 and proximate end wall 20. As best shown in FIG. 5, brackets 68 and 78 are secured to rod 64 and horizontal members 72 and 74 extend therefrom, respectively. Platform member 66 is secured to the members 72 and 74, preferably by screws 76. A brace 78 extends between the members 72 and 74 at the ends thereof opposite the rod 64. Vertical supports B0 and 82 extend from the members 72 and 74, respectively, and are maintained in spaced apart parallel relation by member 84 extending therebetween. Horizontal members 86 and 88 extend therefrom, an opposite sides thereof, and are likewise maintained in spaced apart parallel relation by member 90.

Film camera 92 is secured to platform 66 and includes a lens 94 extending forwardly therefrom. The lens 94 is aligned with the opening 32. The camera 92 furthermore includes a conventional shutter assembly 96, as best shown in FIG. 6, which is connected with zoom lens 98.

Preferably, film camera 92 is of the single lens reflex type wherein the user looks through the lens 94 by means of an eyepiece. The conventional optical glass eyepiece is removed and is replaced with a housing 100 at the rear of camera 92. Right angle prism 102 is mounted in housing 100 so that the image perceived by the lens 94 is directed vertically upon exiting the camera 92, rather than horizontally parallel to the lens 94, as would normally be the case. In this way, the prism 102 couples the camera outlet with the video camera lens 106 and assures that the perceived image is diverted to the video camera 104. The optical glass of the view piece is removed because I have found that too much light loss occurs when this eyepiece is in place.

Video camera 104 is secured to the members 84 and 90 and has a lens assembly 106 with an image opening which is in alignment with the right angle prism 102. In this way, the image received by the lens 94 is transmitted by the prism 102 to the lens 106 of the video camera 104. Because the members 90 and 84 are secured to the members 80 and 82, the alignment of the lens 106 with the prism 102 is always maintained in proper orientation. Therefore, the platform 66 may pivot on the axis defined by the rod 64.

As best shown in FIG. 6, support 108 is secured to the rear surface 110 of front wall 28. Motor drive 112 is mounted to support 108 and has a rotatable shaft 114 to which reel 116 is secured.

Sheave 118 is rotatably mounted to member 74 by rod 120, as best shown in FIG. 5. Cord 122 has several wraps thereof wound about reel 116 and extends therefrom about sheave 118. The remote end 124 of the cord 122 is secured to the support 108. In this way, rotation of the shaft 114 causes the cord to be wrapped upon or from, depending upon the rotation of the shaft 114, the reel 116 so that the changes in length thereof causes the rod 64 to pivot about its axis, and thereby angularly displace the platform 66, and hence the vertical positioning of the lens 94. Naturally, various other means, such as a rack and pinion system may be used to cause pivoting of frame 66.

FIG. 4 illustrates the path which the image perceived by the lens 94 takes prior to being displayed on the video monitor 38. Because the camera 92 is of the type wherein the user sights through the lens 94, then the image received by the video camera 104 is the same as that to which the frame of the film in the camera 92 would be exposed upon the shutter assembly 96 being operated. The video monitor 38 therefore displays the actual image which is sighted in the lens 94. The user can therefore be assured that the image being displayed on the monitor 38 is the actual image which will be exposed to the film contained in the camera 92.

Control cable 126, as best shown in FIG. 2, extends from front wall 28 and is connected to control module 128. Module 128 includes pivot up button 130, pivot down button 132, zoom in button 134 and zoom out button 136. Control module 128 furthermore includes horn button 138 and shutter operator button 140.

The up and down buttons 130 and 132, respectively, are each in electrical connection with motor drive 112 and cause the shaft 114 to rotate in order to take up or let out the cord 122, and thereby cause pivoting of the platform 66. The zoom in and zoom out buttons 134 and 136, respectively, are connected through control cable 142 to the zoom lens 98. The shutter operator button 140 is connected by the control cable 142 to the shutter assembly 96, as best shown in FIG. 6. In this way, the operator can pivot the platform up and down in order to vertically adjust the image which is perceived by the lens 94. Likewise, operation of the buttons 136 and 138 causes the lens 98 to be appropriately adjusted.

As best shown in FIG. 2, LED's 144 extend annularly about the cover plate 34 with respect to the lens 94. Preferably, the LED's 144 pulsate in a rhythmic pattern in order to draw the attention of the person to be photographed to the lens 94. This assures that the person to be photographed is looking into the lens 94, a feature particularly important when the control module 128 is being operated by a person other than the one whose picture is being taken.

Horn 146 is connected to the horn button 138 and is activated thereby in order to draw the attention of the person seated on the seat 30 toward the front wall 28. Such a feature is particularly desirable with children who might otherwise not be looking forwardly, let alone toward the lens 94.

Preferably, the video monitor 38 is disposed closely proximate the lens 94. This is advantageous because it is important that the person who is being photographed not have the eyes looking downwardly, such as could occur if the video monitor 38 was spaced a large distance from the lens 94. Having the lens 94 closely disposed relative to the monitor 38 assures that an individual can be photographed properly and yet be able to look into the lens 94 and at the monitor 38.

OPERATION

Operation of the booth B for self-photography is relatively simple and straightforward. The person to be photographed need merely enter through the opening 16 and be seated on the cushion 30. The curtains 18 and 26 are then closed in order to substantially eliminate external illumination which could otherwise detract from the quality of the photograph. The bulbs 62 are color balanced to simulate daylight in order to provide a natural appearing photograph, particularly when the strobes 56 and 58 are activated.

The person to be photographed aligns or poses before the lens 94 and views the image perceived by the lens 94 in the monitor 38. Because of the close positioning of the monitor 38 to the lens 94, then the image displayed corresponds with the image perceived by the lens 94. As previously explained, the optical system provided by the right angle prism 102 is such that the image perceived by the lens 94 is transmitted to the video camera 104, and hence to the monitor 38.

The user can pivot the platform upwardly or downwardly, as well as zoom in or zoom out as may be required until a preferred pose is achieved. The user can continuously watch the monitor 38 until the proper pose is achieved. Once the proper pose is achieved, then the shutter operating button 140 is depressed. Operation of this button 140 causes the strobes 56 and 58 to illuminate the interior of the booth B at essentially the same time that the shutter assembly 96 causes the film in the camera 92 to be exposed. Because of the optical system provided by the camera 92, which is of the looking through the lens type, then the image exposed on the film corresponds with the image displayed on the monitor.

MULTIPLE EXPOSURE EMBODIMENT

FIGS. 7-10 disclose a second embodiment of the invention which is uniquely adapted for permitting the person being photographed to make multiple exposures on each frame, if desired. The booth B1 of FIG. 7 corresponds substantially to the booth B of FIG. 1, and like numerals have been used to indicate like components. Therefore, the additional disclosure herein shall be directed to those further features permitting multiple exposures to be selectively taken, or single exposures made.

Figure 9:
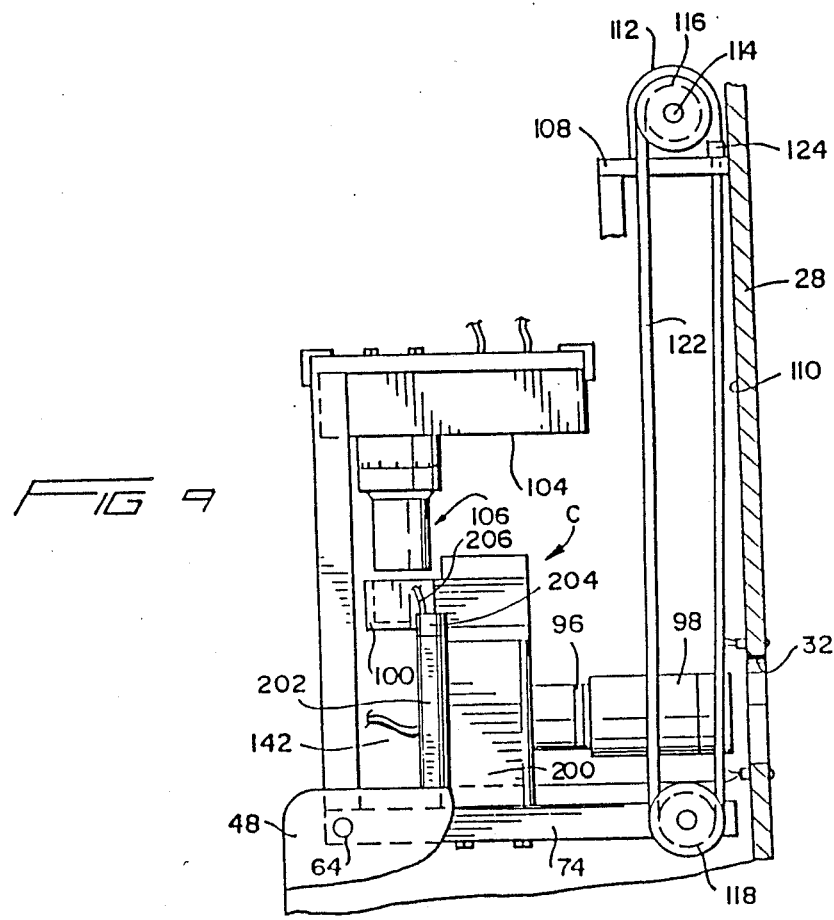
FIG. 9 is a fragmentary elevational view of the camera system of the booth of FIG. 7.
Figure 10:
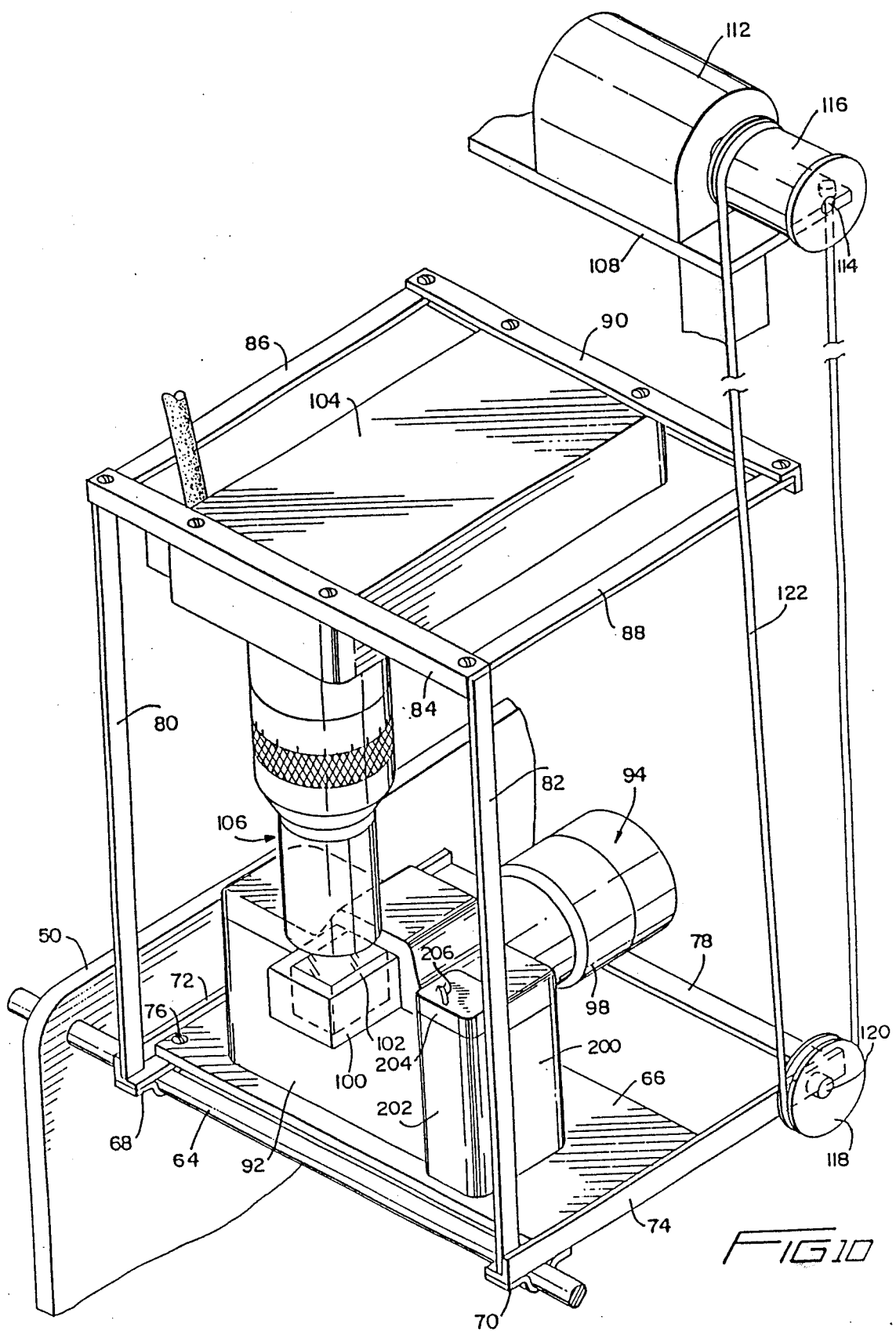
FIG. 10 is a fragmentary perspective view of the camera system of FIG. 9.

Camera C, as best shown in FIG. 10, has a body 200 to which shutter assembly 96 and zoom lens 98 are mounted. Similarly, housing 100, containing the right angle prism 102, is mounted to body 200 for coupling the camera C with the video camera lens 106 of the video camera 104. Control cable 142, as best shown in FIG. 9, likewise leads to body 200 in order to cause operation of the zoom lens 98.

Figure 8:
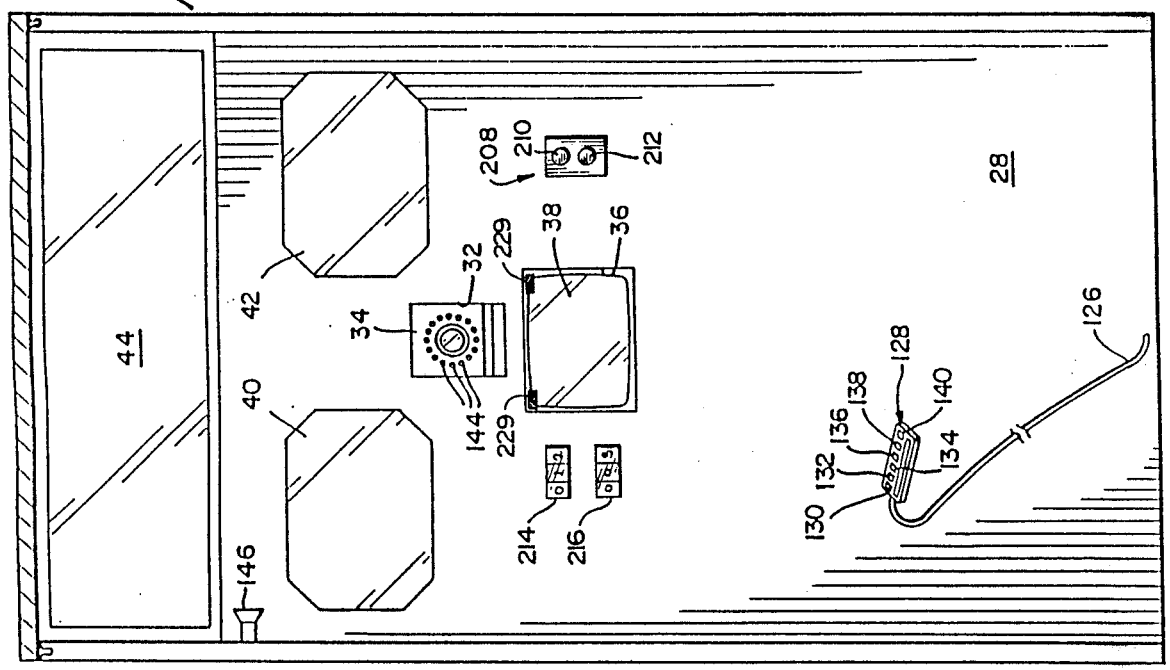
FIG. 8 is an elevational view with portions broken away of the booth of FIG. 7.

The camera C, as best shown in FIGS. 8-10, has a frame advance adapter 202 which communicates with body 200 and has a spool (not shown) about which the film is wound as the photography session progresses. Motor 204 is mounted to adapter 200 and control cable 206 leads to motor 204. Operation of the motor 204 causes the spool of adapter 202 to rotate, and thereby the film to advance. The camera C is, preferably, a single lens reflex camera and motorized film advancement systems are well known for such cameras, and it is believed that no further disclosure thereof need be provided.

Selector assembly 208 is mounted to front wall 28 and communicates through appropriate wires and the like with control cable 206. Selector assembly 208 includes pushbutton switches 210 and 212 which cause or prevent operation of motor 204 after exposure of the film by shutter assembly 96 through use of shutter operator button 140. In this way, should multiple exposures be desired, then it is merely necessary for the person being photographed to depress the pushbutton 210 in order to prevent the motor 204 from operating. In that event, the film will not advance within the body 200 after the shutter assembly 96 has made an exposure and multiple exposures can therefore be taken. Should multiple exposures not be desired, or should a sufficient number of exposures have already been made to a particular frame, then pushbutton 212 merely need be depressed in order to permit the film to advance after the next exposure has been made.

Naturally, it is necessary for the user to be aware of the frame number of the frame which is ready to be exposed, as well as the number of exposures already made to that frame. For this reason, I provide displays 214 and 216 mounted to front wall 28 adjacent video display 38. The displays 214 and 216 are, preferably, illuminated displays, such as provided by LED's, or analog counters or the like. The displays assure that the user is knowledgeable of the condition of the film within the body 200. The display 214, preferably, displays the frame number of the frame ready to be exposed, while the display 216 indicates the number of exposures already made to that frame. FIG. 7, as illustrated, indicates that frame 12 is the frame which is ready to be exposed, and that three exposures have already been made to that frame.

Figures 11, 12:
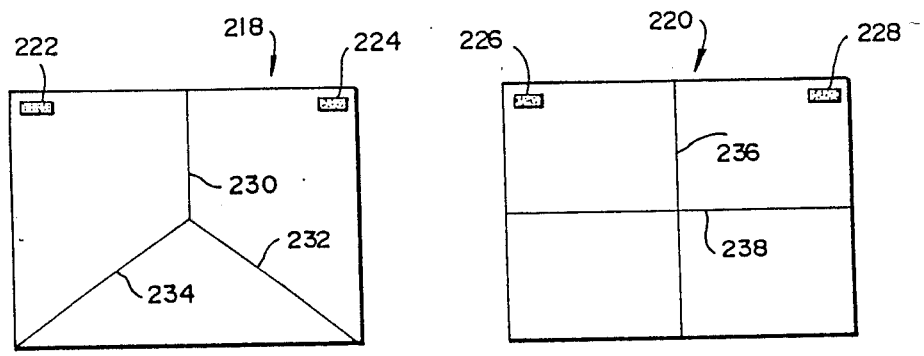
FIGS. 11 and 12 are rear elevational views of grids used with the booth of FIG. 7.

FIGS. 11 and 12 disclose templates or grids 218 and 220, respectively, which are utilized for defining exposure areas on video monitor 38. Each of the grids 218 and 220 is comprised of a transparent, preferably, flexible sheet of material, such as acetate or the like. One half of a Velcro ® attachment is provided on each of the grids 218 and 220, such as at 222, 224 226, and 228, respectively. The corresponding half 229 of the Velcro attachments 222, 224, 226, 228 are mounted on the video display 38, as best shown in FIG. 7, in order to permit the grids 218 and 220 to be removable secured in overlying relation to the display 38.

The grid 218 has non-transparent lines 230, 232 and 234 dividing the grid 218 into three exposure areas. The grid 220, on the other hand, has lines 236 and 238 defining four exposure areas. The lines 230, 232, 234, 236 and 238 are non-transparent in order to be visible to the user, and may be provided by suitable inks and the like. It should be clear that the exposure areas of grids 218 and 220 can be of any conceivable number and of any shape. Likewise, although I have disclosed the grids 218 and 220 as being removable secured to the display 38, it should be clear that similar grids could be incorporated into the video display system through appropriate computer software.

MULTIPLE EXPOSURE OPERATION

Use of the booth B1 to obtain multiple exposure photographs can proceed fairly swiftly in view of selector assembly 208. The person to be photographed first enters the booth B1 and draws the curtain 18 closed, in order to control the illumination within the booth B1. Should single exposures only be desired, then the button 212 is depressed, thereby causing the motor 204 to be operated each time the shutter button 140 is depressed and caused a frame to be exposed. The person to be photographed poses on cushion 30, and pivots the frame 66 upwardly and downwardly, through the use of control module 128. When the desired pose has been struck, then the button 140 is depressed, causing the frame to be exposed and subsequently advanced. The display 214 also increments by one, in order to indicate the appropriate frame number.

Should multiple exposures be desired, either for all frames or for some of the frames of a particular roll, then the push button 210 is pressed at the appropriate time. This has the effect of preventing operation of the motor 204 after the shutter button 140 has been pressed.

I prefer that the grids 218 or 220 be used when multiple exposures are to be taken, in order to assure proper positioning of one exposure relative to another. In this regard, the appropriate grid 218 or 220 is secured to the display 38. The person then pivots the frame 66, or appropriately positions them self on the cushion 30, so that the image viewed by the lens 98 and displayed by the monitor 38 is positioned within one of the exposure areas defined by the lines of the selected grid. Once the pose has been properly positioned within the appropriate exposure area, and the pose has been struck, then the shutter button 140 can again be depressed, thereby incrementing the display 216 by one, but otherwise preventing operation of the motor 204. The person then once again poses so that the image perceived by the camera and displayed on the monitor 38 is positioned within a desired one of the exposure areas. Once again, the exposure may then be made. While it is not necessary to use the grids 218 and 220 in order to obtain multiple exposures, I have found them desirable as a means for preventing blurred, compounded or otherwise unrecognizable photographs.

When the last multiple exposure is about to be made, then the user need merely depress the push button 212 in order to permit the motor 204 to be energized upon the next exposure being made. Once the exposure has been made, then the display 214 increments by one additional frame number, while the display 216 clears and indicates that no exposures have been made on the particular frame. In this way, the user is always aware of how many frames have been exposed, and how many exposures have been made to the frame now available for exposure.

While this invention has been described as having a preferred design, it is understood that it is capable of further modifications, uses and/or adaptations of the invention following in general the principle of the invention and including such departures from the present disclosure as come within known or customary actice in the art to which the invention pertains, and as may be applied to the central features hereinbefore set forth, and fall within the scope of the invention of the limits of the appended claims.

What I claim is:
1. Self-photography booth, comprising:
   (a) a booth having a first end portion for a person to be photographed and a spaced and aligned opposite second end portion;
   (b) camera means operably associated with said second end portion and including a selectively operable film advance system for advancing a length of film having a plurality of frames through said camera means in a sequential manner and means for selectively exposing a frame of the film with an image of the person;

(c) video camera means operably associated with said second end portion and with said camera means for receiving the image of the person perceived by said camera means;

(d) video display means operably associated with said video camera means and with said second end portion for displaying the perceived image;

(e) means operably associated with said camera means for causing exposure of a frame of the film with the perceived image; and, (f) means operably associated with said camera means for selectively causing or preventing operation of said film advance system after operation of said exposure means so that multiple exposures may be made by preventing operation of the film advance system and thereby preventing the film from advancing, and operation of said film advance system causes the film to advance to the next frame.

2. The booth of claim 1, wherein:

(a) first and second display means are operably associated with said exposure and causing or preventing means and are perceivable by the person, one of said display means for indicating the frame which is to be exposed and the other of said display means for indicating the number of exposures already made to that frame.

3. The booth of claim 2, wherein:

(a) each of said display means is an illuminated display.

4. The booth of claim 1, wherein:

(a) said film advance system includes an electric motor for causing advancement of the film.

5. The booth of claim 1, wherein:

(a) said means for causing or preventing includes manually operable switch means, said switch means positioned proximate the person to be photographed.

6. The booth of claim 1, wherein:

(a) grid means are operably associated with said video display means for defining on the video display means a plurality of exposure areas so that the person to be photographed may perceive the orientation on the film of an exposure.

7. The booth of claim 6, wherein:

(a) said grid means an comprised of a transparent material and have a plurality of non-transparent lines defining the exposure areas.

8. The booth of claim 7, wherein:

(a) said grid means comprised of a resilient plastic sheet; and, (b) means are operably associated with said sheet for selectively securing said sheet relative to the video display means.

9. The booth of claim 8, wherein:

(a) said securing means comprised of Velcro.

10. The booth of claim 6, wherein:

(a) there are a plurality of grid means, each grid means having a selected number of exposure areas and/or exposure area configurations.

11. The booth of claim 1, wherein:

(a) means are operably associated with said camera means and said video camera means for maintaining operable association therebetween; and, (b) said maintaining means includes means for varying the orientation of said camera means relative to the person to be photographed.

12. The booth of claim 11, wherein:

(a) said maintaining means includes a pivotal platform, said camera means and said video camera means being secured to said platform in fixed association therewith.

13. Self-photography booth, comprising:

(a) a booth having a first end portion for posing of a person to be photographed and an opposite second end portion for positioning a camera system;

(b) said camera system comprising a single lens reflex camera having a motorized film advance system and remotely operable means for causing selective exposure of the film;

(c) video camera means coupled with said camera for receiving the image of the person perceived by said camera;

(d) video display means operably associated with said video camera means for displaying the received perceived image so that the person to be photographed may view the image being perceived by said camera;

(e) means operably associated with said camera system for permitting or preventing operation of said film advance system after said remotely operable means has caused exposure of the film so that prevention of operation of said film advance system prevents the film from advancing to the next frame and thereby permits multiple exposures to be taken and permitting operation of said film advance system causes the film to advance to the next frame; and, (f) display means operably associated with said camera system for indicating to the person to be photographed the frame number of the frame to be exposed and the number of exposures made to that frame.

14. The booth of claim 13, wherein:

(a) at least a first grid comprised of a transparent material is aligned with and overlies said video display means, said grid having at least a first non-transparent indicia applied thereto for dividing said grid into at least two exposure areas.

15. The booth of claim 14, wherein:

(a) means are operably associated with said grid for releasably securing said grid relative to said video display means.

16. The booth of claim 13, wherein:

(a) said display means includes first and second illuminated displays, one of said displays for displaying the number of the frame to be exposed and the other of said displays for displaying the number of exposures made to that frame.

17. The method of taking self portraits, comprising the steps of:

(a) providing a photography booth comprising a first end portion for a person to be photographed and a spaced and aligned opposite second end portion for positioning a camera system, the camera system comprising a camera having a motorized film advance system and remotely operable means for causing selective exposure of the film, a video camera is coupled with the camera for receiving the image of the person perceived by the camera and a video display means is operably associated with the video camera for displaying to the person the image being perceived by the camera, means are operably associated with the camera system for permitting or preventing operation of the film advance system so that after operation of the remotely operable means the film advances to the next frame when the permitting or preventing means are set to permit advancement and the film is prevented from advancing so that multiple exposures may be taken when the permitting or preventing means are set to prevent advancement, and display means are operably associated with the camera system for indicating to the person to be photographed the number of the frame to be exposed and the number of exposures already made to that frame;

(b) setting the permitting or preventing means in order to cause the film to advance or to be prevented from advancing after the exposure has been made;

(c) posing a person to be photographed in the booth; and, (d) operating the remotely operable means and thereby causing the film to be exposed.

18. The method of claim 17, including the steps of:
  (a) defining at least first and second exposure areas on the video display means;
  (b) setting the permitting or preventing means so that advancement of the film is prevented;
  (c) aligning the person to be photographed with the camera so that the perceived image is displayed in one of the exposure areas; and,
  (d) causing the film to be exposed.

19. The method of claim 18, including the steps of:
  (a) aligning the person to be photographed with the camera after the film has been exposed so that the perceived image is displayed in the other one of the exposure areas; and,
  (b) causing the film to be exposed.

20. The method of claim 18, including the steps of:
  (a) setting the permitting or preventing means so that advancement of the film is permitted after the film has been exposed; and,
  (b) incrementing the display means to the frame number of the frame ready for exposure and indicating that no exposures have been made to that frame after the film has been exposed.

* * * * *